United States Patent [19]
Lucas et al.

[11] Patent Number: 5,691,582
[45] Date of Patent: Nov. 25, 1997

[54] CAN BODY MAKER WITH LINEAR MOTOR REDRAW ACTUATOR

[75] Inventors: Phillip John Lucas, Lakewood, Colo.; Crawford R. Meeks, Woodland Hills, Calif.

[73] Assignee: Coors Brewing Company, Golden, Colo.

[21] Appl. No.: 380,952

[22] Filed: Jan. 31, 1995

Related U.S. Application Data

[63] Continuation-in-part of Ser. No. 36,043, Mar. 23, 1993, abandoned.

[51] Int. Cl.$^6$ ................................................ H02K 41/00
[52] U.S. Cl. .................. 310/14; 310/15; 310/347; 310/417; 310/430
[58] Field of Search .......................... 310/12, 14, 15; 72/347, 417, 430, 456, 349, 350, 351, 361

[56] References Cited

U.S. PATENT DOCUMENTS

| | | | |
|---|---|---|---|
| 3,696,657 | 10/1972 | Maytag | 72/450 |
| 4,815,949 | 3/1989 | Rabson | 417/417 |
| 4,956,990 | 9/1990 | Williams | 72/349 |
| 5,212,977 | 5/1993 | Stuart | 72/347 |
| 5,275,033 | 1/1994 | Riviere | 72/62 |
| 5,317,221 | 5/1994 | Kubo et al. | 310/12 |
| 5,357,779 | 10/1994 | Hahn et al. | 72/347 |

Primary Examiner—Thomas M. Dougherty
Assistant Examiner—Jonathan Link
Attorney, Agent, or Firm—Klaas, Law, O'Meara & Malkin, P.C.

[57] ABSTRACT

A can body maker wherein the redraw sleeve is provided with an plurality of air escape openings to provide for the passage of air as the ram moves through the redraw sleeve and wherein the redraw sleeve is attached to the armature of a linear motor which includes a generally cylindrical armature which moves within a surrounding, coaxial stator. The armature includes a plurality of axially spaced apart armature salient pole rings separated by permanent magnet rings. The stator includes a plurality of axially spaced apart stator salient poles which each form a ring radially spaced from and surrounding a portion of the armature. The axial spacing between adjacent stator salient pole rings is one-third greater than the axial spacing between the armature salient pole rings, and an electromagnetic coil extends circumferentially within the stator around the armature between each stator salient pole ring. At least six such electromagnetic coils are provided, and are connected in three primary pairs wherein each pair of electromagnetic coils has a 120 degree current phase difference with respect to the other two primary pairs of electromagnetic coils, when energized. The at least six electromagnetic coils are all energized continuously with sinusoidally varying currents to generate a translating magnetic field wave which utilizes reluctance forces between the armature salient pole rings and the stator salient pole rings to produce translatory motion of the armature relative to the stator.

30 Claims, 5 Drawing Sheets

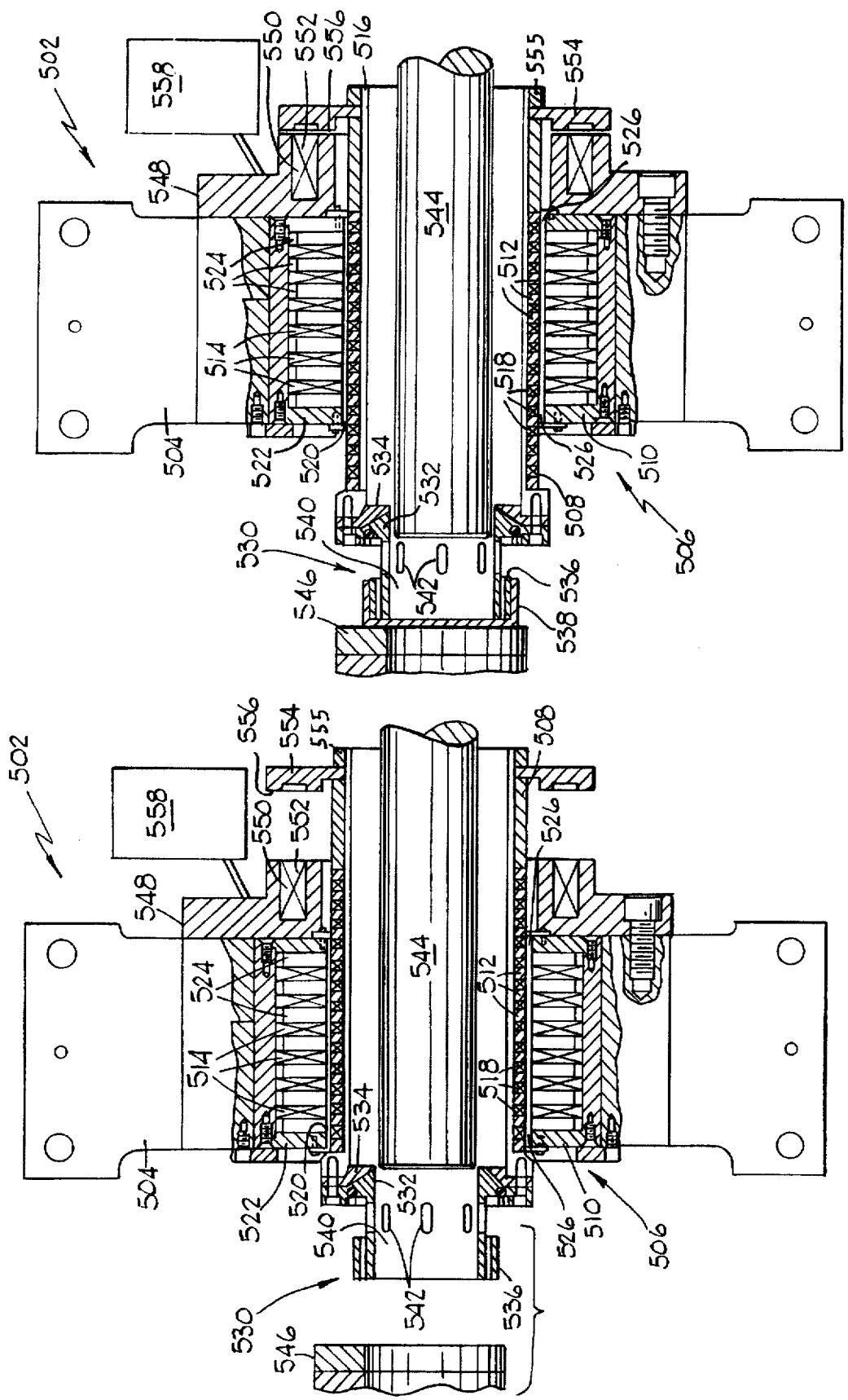

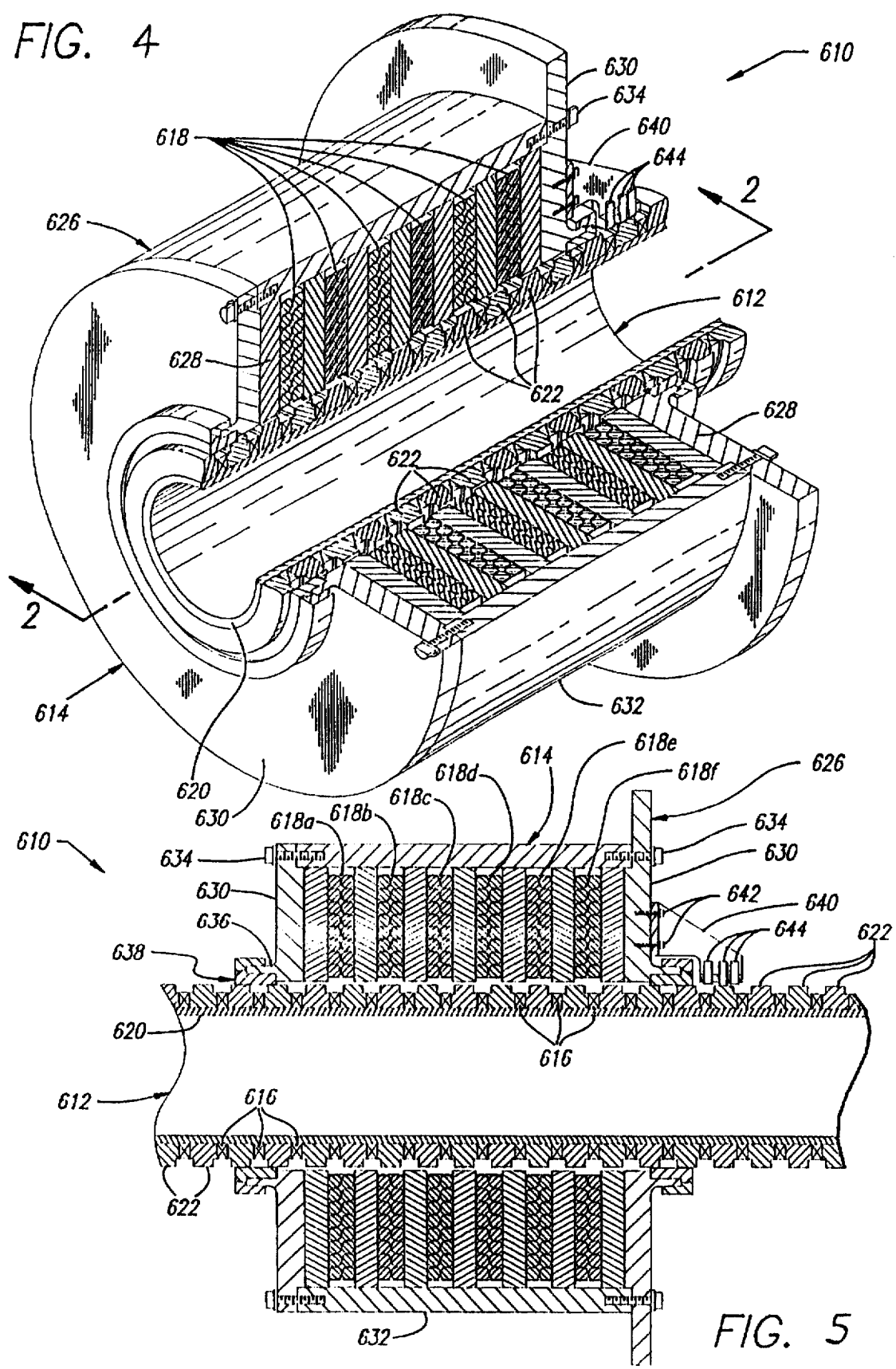

CAN BODY MAKER WITH LINEAR MOTOR REDRAW ACTUATOR

This application is a continuation-in-part of U.S. patent application Ser. No. 08/036,043 filed Mar. 23, 1993, now abandoned, for LINEAR MOTOR by Crawford R. Meeks.

FIELD OF THE INVENTION

This invention relates generally to can body making apparatus and more particularly to can body making apparatus wherein the redraw sleeve is provided with air escape means and is reciprocated using a linear motor.

BACKGROUND OF THE INVENTION

There are various types of can body apparatuses in use in which a ram moves through a redraw-sleeve to move a can body reform through forming and ironing dies to form an elongated can body. The ram must have sufficient force to expel the air in the redraw sleeve between the can body preform and the end of the ram. Also, there are many ways to reciprocate the redraw sleeve, one of which is a linear motor having a movable armature and a coaxial fixed stator assembly, wherein coils in the stator assembly are sequentially energized to generate a translating magnetic field wave that interacts with magnetic poles of the armature to produce translatory motion.

Electric motors conventionally include a stationary portion or stator, and a movable portion. In electric motors adapted for turning an output shaft, the movable portion, called the rotor, is concentrically arranged within the stator. Although the most common rotary motor employs a cylindrical rotor rotating within an annular stator, the reverse arrangement is also known.

Many machines require translatory motion, including industrial robots, vehicle suspension systems, stamping and pressing machines, paper feeders and the like. Early linear drives often used lead screws or rack and pinion drives to provide the linear movement. Lead screws are generally limited to low speeds and low accelerations, have backlash between the ball nut and the screw, require periodic maintenance and larger screw dimensions as the length of travel increases. Rack and pinion drives are often speed and acceleration limited and contain backlash. It has been found that the conversion of rotary motor motion into translatory motion using cranks, rack and pinion gearing and other types of mechanical linkages is inefficient, undesirable in many applications, and more complex than direct drive linear motors.

Linear motors typically employ a stator which can be thought of as being similar to the stator of a rotary motor which has been developed, or opened out, into a flattened assembly. Similarly, the rotor of the rotary motor is replaced by a linear counterpart which moves in a line with respect to the stator.

One type of linear motor is the linear stepper motor which is essentially the equivalent of a rotary stepper motor. Linear stepper motors usually comprise a stator bar having a plurality of stator teeth disposed at equal intervals in a longitudinal direction, and a slider or armature having a plurality of slider teeth opposed to the stator teeth with a small gap therebetween. Typically, stator teeth and the slider teeth must be kept accurately as close to each other as possible without physical contact. Therefore, a pair of sleeve guide bearings, rails or rollers are provided for maintaining the fixed small gap between the stator teeth and the slider teeth during movement of the slider.

Another type of linear motor is the moving magnet motor. These motors incorporate a series of stacked ferromagnetic laminations with the wire forming the coils wound integrally into the laminations. These motors are the linear equivalent of the standard rotary, brush-type direct current motors. The linear slider, corresponding to the rotor, incorporates several permanent magnets, and is held in a fixed air gap away from the laminations, corresponding to the stator. This air gap is generally larger than that of the linear stepper motors, reducing the some extent the manufacturing tolerances and bearing or support system maintenance requirements.

Yet another type of linear motor is the moving coil linear motor. These can be either brushed or brushless designs and have a moving coil passing through an air gap created by either two rows of permanent magnets and magnetic circuit completion means or back iron, or one row of permanent magnets and a magnetic circuit completion means using one back iron and one ferromagnetic bar.

Although many prior linear motors have found significant commercial success, there has been a continuing need for improved linear motor designs and construction techniques which improve the operational characteristics of the linear motor while reducing material and manufacturing costs. Accordingly, there is a need for an improved linear motor design which is spatially compact and electrically efficient. Moreover, such a linear motor is needed which is highly producible and inexpensive to manufacture from commercially available standard material forms rather than specialty parts which tend to be very expensive. The present invention fulfills these needs and provides other related advantages.

SUMMARY OF THE INVENTION

In a preferred embodiment of the invention, the can body making apparatus has a redraw sleeve that is provided with air escape means comprising a plurality of spaced apart openings formed in the sidewall of the redraw sleeve. The redraw sleeve is reciprocated by an improved linear motor which utilizes both the constant magnet flux generated by a plurality of permanent magnetic rings, and the controllable magnetic flux generated through the use of electromagnetic coils, to produce translatory motion of an armature relative to a stator. The armature is provided with a series of alternating adjacent armature salient poles and permanent magnets, and the stator is provided with a series of stator salient poles and paired electromagnetic coils. The paired electromagnetic coils in the stator are sequentially energized to generate a translating magnetic field wave that interacts with magnetic flux generated by the permanent magnets of the armature to produce controllable translatory motion of the armature relative to the stator.

In a preferred form of the invention, a plurality axially spaced apart salient poles form rings surrounding the armature. An axially polarized permanent magnet ring is situated between each adjacent pair of armature salient poles, wherein each permanent magnet ring is oppositely polarized with regard to each adjacent permanent magnet ring. A non-magnetic sleeve underlies the armature salient pole rings and the permanent magnet rings.

The stator comprises a plurality of axially spaced apart salient poles, each forming a ring radially spaced from and surrounding a portion of the armature. The axial spacing between adjacent stator salient poles is one-third greater than the axial spacing between the armature salient poles. An electromagnetic coil is situated between each adjacent pair of stator salient poles, and, like the stator salient poles, is radially spaced from and extends circumferentially around a portion of the armature. More particularly, the stator includes at least six electromagnetic coils, each being situated between a respective adjacent pair of stator salient poles. The electromagnetic coils are connected in three primary pairs, wherein each pair of electromagnetic coils has a 120 degree current phase difference with respect to the other two primary pairs of electromagnetic coils, when energized.

Means are provided for energizing the electromagnetic coils to generate a translating magnetic field wave capable of producing a translatory motion of the armature relative to the stator. In this regard, the electromagnetic coils are all energized continuously with sinusoidally varying currents having changing phases and polarity, such that additional magnetic flux is provided having the same polarity as magnetic flux generated by the permanent magnets between facing armature and stator salient poles positioned to move the armature relative to the stator in a desired direction. Further, additional magnetic flux is provided having an opposite polarity as magnetic flux generated by the permanent magnets between facing armature and stator salient poles positioned to resist movement of the armature relative to the stator in the desired direction. This arrangement tends to maximize thrust of the armature relative to the stator.

The electromagnetic coils are arranged such that a first coil is paired with a third coil and are connected so that the first coils has an opposite polarity compared with a third coil. A second coil is paired with a fifth coil and are connected so that the second coil and the fifth coil both have the same polarity. A fourth coil is pared with a sixth coil and are connected so that the fourth coil has an opposite polarity compared with the sixth coil, when energized. In such an arrangement, when the electromagnetic coils are continuously energized, the phasing and polarity of the current through the electromagnetic coils are changed to maximize thrust of the armature relative to the stator.

A three-phase delta or "Y" connection provides means for sequentially energizing the electromagnetic coils. Means are also provided for sensing the position of the armature relative to the stator, to provide closed loop feedback control to the linear motor. The stator has sleeve bearings for maintaining radial positioning of the stator relative to the armature. In the illustrated embodiment, the stator is fixed and the armature moves relative to the stator.

A preferred control means for controlling the operation of the linear motor comprises the use of Hall-effect sensors for reciprocating the armature and an LVDT for activating the Hall-effect sensors. Another preferred control means are computer means, responsive to signals indicating the position of the leading edge of the ram, provided with appropriate software.

Other features and advantages of the present invention will become apparent from the following more detailed description, taken in conjunction with the accompanying drawings which illustrate, by way of example, the principles of the invention.

BRIEF DESCRIPTION OF THE DRAWINGS

Illustrative preferred embodiments of the invention are illustrated in the drawings in which:

FIG. 1 is a top plan view with parts in section of a preferred embodiment of the invention with the armature in an outer position;

FIG. 2 is a view similar to FIG. 1 with the armature in an inner position;

FIG. 4 is a fragmented perspective view of an electromagnetic linear motor embodying the invention, showing the relative configuration of a generally cylindrical and movable armature within a coaxial stationary stator;

FIG. 5 is a fragmented sectional view taken generally along the line 2—2 of FIG. 1;

DETAILED DESCRIPTION OF THE PREFERRED EMBODIMENTS

Figure 3:
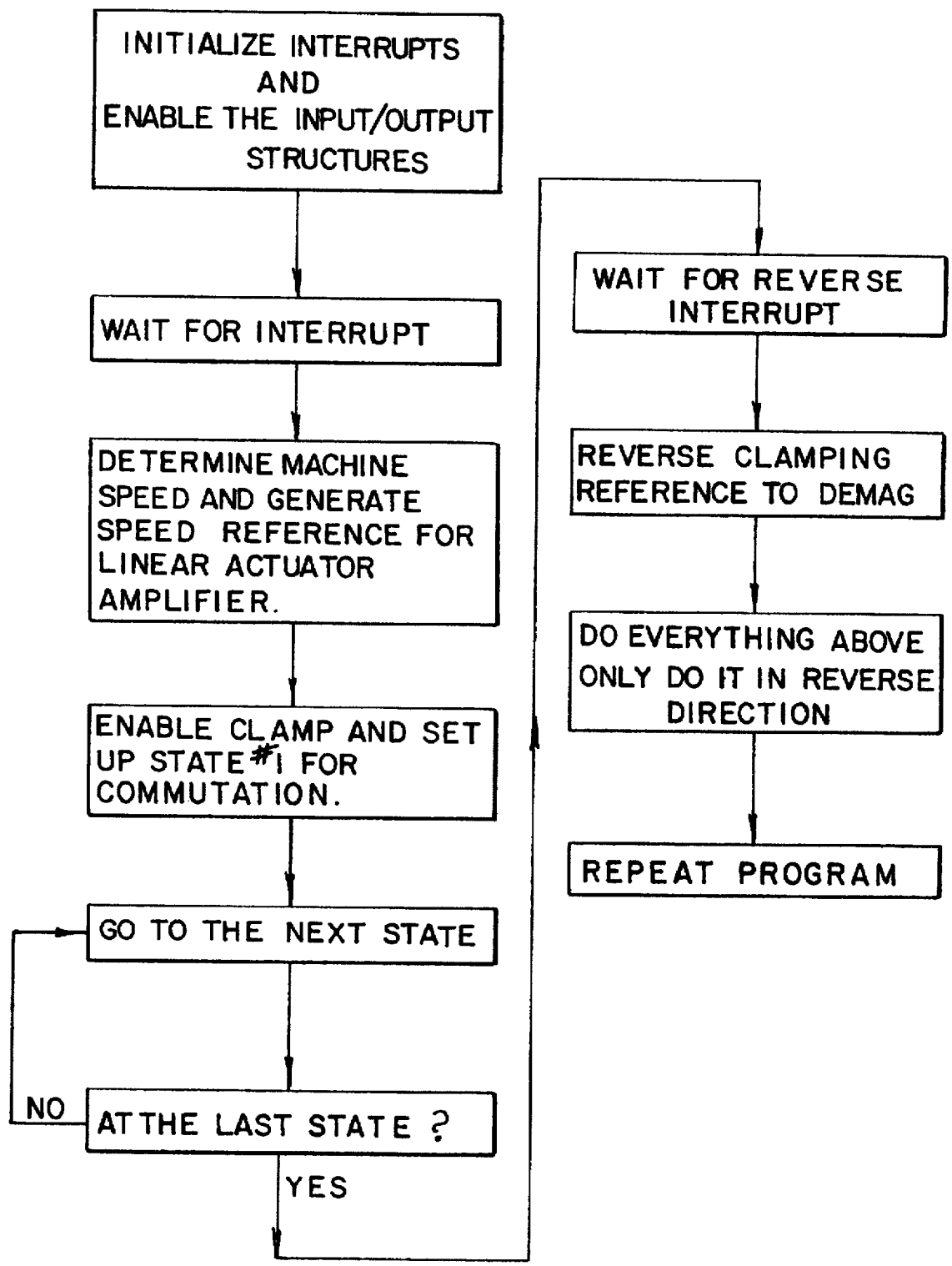
FIG. 3 is an block diagram illustrating the operation of the control means for operating the linear motor.

In FIGS. 1 and 2, there is illustrated can body making apparatus 502 having a support 504 that is mounted on a support frame such as that illustrated in U.S. Pat. No. 5,357,779 which is incorporated herein by reference thereto. A linear motor 506 comprising a movable cylindrically shaped armature 508 and a coaxial fixed stator assembly 510 is mounted on the support 504. The linear motor 506 uses both the constant magnetic force generated by a plurality of permanent magnetic rings 512 and the controllable magnetic flux generated through the use of electromagnetic coils 514 to produce translatory motion of the armature 508 relative to the stator assembly 510. The armature 508 comprises a non-magnetic tubular sleeve 516 which underlies and supports thereon a plurality of the permanent magnetic rings 512 and axially spaced apart rings 518 or salient poles of a ferromagnetic material. The permanent magnetic rings 512 and the rings 518 have the same cross sectional configuration. These rings 518 provide salient poles for the armature 508 the function of which will be described in greater detail below. An axially polarized permanent magnet ring 512 is situated between each adjacent pair of armature salient poles 518, wherein each permanent magnet ring 512 is oppositely polarized with regard to each adjacent permanent magnet ring 512. The permanent magnet rings 512 cooperatively produce a varying intensity magnetic field in an air gap 520 between the armature 508 and the stator assembly 510, which interacts with a translating magnetic field wave produced by the electromagnetic coils 514 within the stator assembly 510 to linearly move the armature 508 relative to the stator assembly. The rings 518 and the adjacent permanent magnet rings 512 form a magnetic sleeve surrounding the underlying armature tube 516.

The stator assembly 510 comprises a housing 522 which supports therein a series of alternating iron disc spacers or salient poles 524 and the electromagnetic coils 514 which are radially spaced from and surround the armature 510. Non-magnetic sleeve guide bearings 526 are mounted on the housing 522 and serve to guide and control the radial centering of the armature 508 within the stator assembly 510 and to resist decentering magnetic forces which are produced if the armature 510 is allowed to become eccentric in the air gap 520. Further details of the structure and the operation of the linear motor 506 are discussed more fully below in relation to FIGS. 4-10.

A redraw sleeve 530 has one end portion 532 mounted on the end portion 534 by a conventional spherical fitting to permit relative movement therebetween. The other end portion 536 holds a can body preform 538, FIG. 2. The central portion 540 is provided with a plurality of openings 542 which allow the escape of air at least during part of the movement of the ram 544 through the redraw sleeve 530. A housing 546, holding can forming and ironing dies (not shown), is located adjacent to the redraw sleeve 530. An electromagnetic coil means 548 is mounted on the support 504 and has an annular U-shaped opening 550 in which a electric coil 552 is located. An annular armature 554 is secured to the armature 508 for movement therewith using a locknut 555 and has an annular surface 556 that is moved to a location adjacent to but spaced from the electric coil 552. As explained in the '779 patent, the annular armature 554 and the energized electric coil 552 cooperate to provide the desired force by the redraw sleeve 530 on the can body preform 538.

The operation of the linear motor 506 is controlled by the computer means 558. In a preferred embodiment of the invention, the hardware for the computer means 558 comprises a Reliance Automax Processor Version 3.4b; a Westramp Amplifier Model 80a40; a Delta-Tau for axis real time controller PMAC-LITE; an Automated Controls Clamp amplifier model 40a20 and a Reliance Power Module HR2000. The computer means 558 are operated in accordance with the software program enclosed herewith as Appendix A. The computer means 558 functions in response to signals generated by the position of the leading edge of the ram and energizes a three phase delta connection 646, described below, to move the armature 508.

The computer means 558 operates in response to a signal received from an electronic encoder unit which is similar to the electronic encoder unit 50 of the '779 patent which signal is representative of the ram axial position. When the ram has reached a predetermined position relative to the redraw assembly, a signal is sent to the computer means 558 which starts generating signals to the three phase delta connection 646 to move the armature 508 toward the housing 546. When the can body preform 538 is in contact with the housing 546 and the other end portion 536 of the redraw sleeve 530, the movement of the armature 508 is stopped and the computer energizes the electromagnetic coil 552 to apply an attracting force on the annular armature 554. An annular space exists between the electromagnetic coil 552 and the surface 556 of the annular armature 554. Since the annular armature 554 is secured to the armature 508, the force applied to the annular armature 554 is applied by the redraw sleeve 530 to the can body preform 538. The amount of force applied by the electromagnetic coil 552 is of a predetermined value and may be a constant force of a force that is varied as the ram 544 moves the can body preform 538 into the housing. When the ram 544 reaches a predetermined position, a signal is sent to the computer means 558 and the electromagnetic coil 552 is deenergzied.

When the ram is moving out of the housing 546, its sends a signal to the computer means 558 to start generating signals to the three phase delta connection 646 in reverse so that the armature 508 is moved in a direction away from the housing 546 to its original starting position illustrated in FIG. 1. The process is repeated on the next stroke of the ram. While the electronic encoder 50 of the '779 patent is associated with the drive of the type illustrated in U.S. Pat. No. 3,696,657 to Maytag, it also may be associated with the drive of the type illustrated in U.S. Pat. No. 4,956,990 to Williams, each of these patents being incorporated herein by reference thereto.

Another preferred embodiment of an electromagnetic linear motor 610 is illustrated in FIGS. 4-8. The linear motor 610 comprises a movable, cylindrically shaped armature 612 and a coaxial fixed stator assembly 614. The relation between "fixed" and "movable" is, of course, reversible. The linear motor 610 utilizes both the constant magnetic flux generated by a plurality of permanent magnet rings 616, and the controllable magnetic flux generated through the use of electromagnetic coils 618, to produce translatory motion of the armature 612 relative to the stator assembly 614.

In accordance with the present invention, and with specific reference FIGS. 1 and 5, the armature 612 comprises a non-magnetic tubular sleeve 620 which underlies and supports thereon a plurality of the permanent magnet rings 616 of ferromagnetic material. These inverted "t"-shaped rings 622 provide salient poles for the armature 612, the function of which will be described in greater detail below. An axially polarized permanent magnet ring 616 is situated between each adjacent pair of armature salient poles 622, wherein each permanent magnet ring 616 is oppositely polarized with regard to each adjacent permanent magnet ring. The permanent magnet rings 616 cooperatively produce a varying intensity magnetic field in an air gap 624, which interacts with a translating magnetic field wave produced by the electromagnetic coils 618 within the stator assembly 614 to linearly move the armature 612 relative to the stator assembly. The inverted "T"-shaped rings 622 and the adjacent permanent magnet rings 616 form a magnetic sleeve surrounding the underlying armature tube 620.

The stator assembly 614 comprises a housing 626 which supports therein a series of alternating iron disc spacers 628 and electromagnetic coils 618 which are radially spaced from and surround the armature 612. The stator housing 626 includes a pair of disk-like end flanges 630 which are connected to an outer steel cylinder 632 by bolts 634. Each of the end flanges 630 includes an axially protruding ring member 636 which supports thereon a non-magnetic sleeve guide bearing 638 which contacts the outermost surfaces of the armature 612, and particularly the upper surfaces of the armature salient poles 622. The sleeve guide bearings 638 serve to guide and control the radial centering of the armature 612 within the stator assembly 614 and to resist decentering magnetic forces which are produced if the armature is allowed to become eccentric within the air gaps 624.

The iron disk spacers 628 within the stator housing 626 provide a plurality of axially spaced apart salient poles for the stator 614. The axial spacing between adjacent stator salient poles 628 is one-third greater than the axial spacing between the armature salient poles 622. This difference in pitch allows the stator 614 to develop forces on the armature 612 by the interaction of the permanent magnet field in the armature and an electromagnetic field in the stator. An electromagnetic coil 618 is situated between each adjacent pair of stator salient poles 628. The stator salient poles 628 and the electromagnetic coils 618 are all radially spaced from and extend circumferentially around an adjacent portion of the armature 612. With the axial spacing or pitch of the stator salient poles between the armature salient poles 622, six electromagnetic coils 618 are utilized to develop the translating magnetic field wave in the stator 614, to cause the desired translatory motion of the armature 612.

A bracket 640 is attached to the stator housing 626 by means of secondary bolts 642, for positioning several Hall-effect sensors 644 relative to the stator 614 that are activated by the passage of the permanent magnet field of the armature 612.

Figure 6:
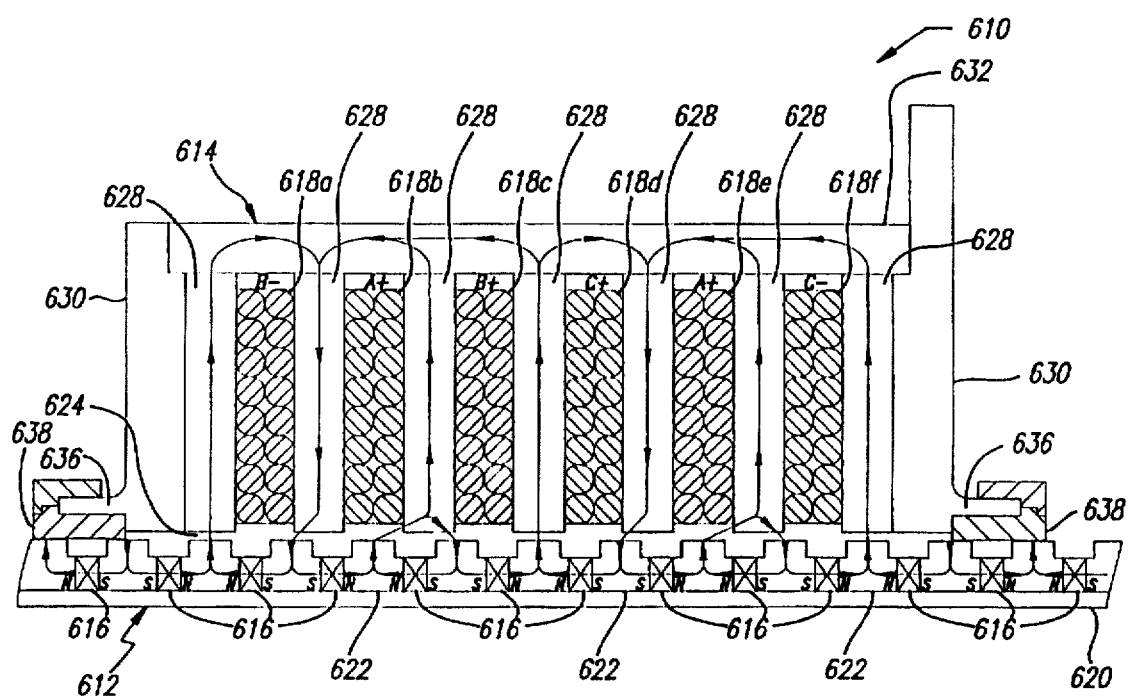
FIG. 6 is a fragmented sectional schematic view similar to the upper half of the linear motor illustrated in FIG. 2, showing the net magnetic flux generated by the permanent magnets and the electromagnets when the armature is in a first primary position relative to the stator.
Figure 7:
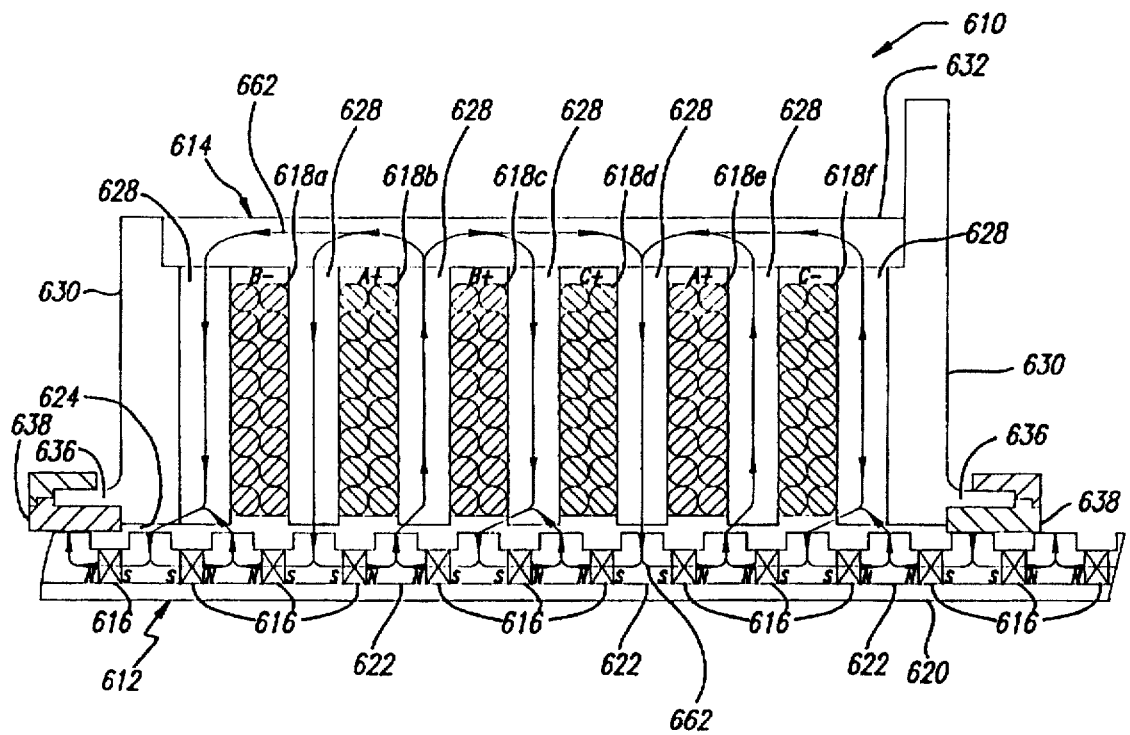
FIG. 7 is a schematic fragmented sectional view similar to that illustrated in FIG. 6, showing the net magnetic flux generated by the permanent magnets and the electromagnetic when the armature in a second primary position relative to the stator.
Figure 8:
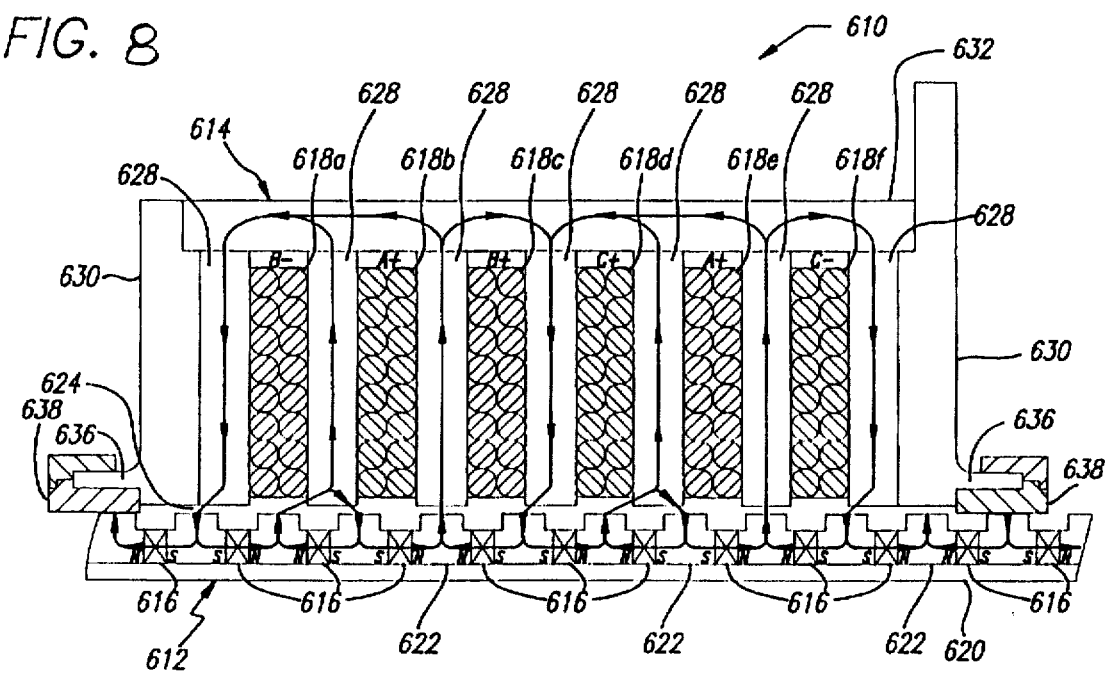
FIG. 8 is a schematic fragmented sectional view similar to that illustrated in FIGS. 6 and 7, showing the net magnetic flux generated by the permanent magnets and the electromagnets when the armature in a third primary position relative to the stator.
Figure 9:
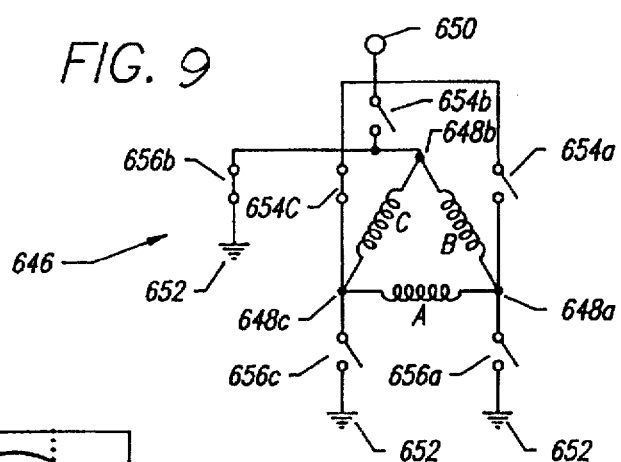
FIG. 9 is a schematic representation of a typical three-phase delta connection.

With reference now to FIGS. 6–8, the six electromagnetic coils 618 are connected in three primary pairs, wherein each pair of electromagnetic coils has a 120 degree current phase difference with respect to the other two primary pairs of electromagnetic coils, when energized. Numbering the coils left to right, the first coil 618a is paired with the third coil 618c, and these two electromagnetic coils are connected to one another so that the first coil generates a magnetic field having an opposite polarity compared with the magnetic field generated by the third coil 618c. The second electromagnetic coil 18b is paired with the fifth electromagnetic coil 618e, and this second pair of electromagnetic coils are connected to one another so that the second electromagnetic 618b and the fifth electromagnetic coil 618e both generate a magnetic field having the same polarity. The fourth electromagnetic coil 618d is paired with the sixth electromagnetic coil 618f, and these two electromagnetic coils are connected to one another so that the fourth electromagnetic coil 618d develops a magnetic field having an opposite polarity with the magnetic field developed by the sixth electromagnetic coil 618f, when energized.

A three-phase delta connection 646 (FIG. 9) is utilized to sequentially energize the electromagnetic coils 618b. In FIGS. 6–10, the first pair of coils 618a and 618c are represented by the letter "B", the second pair of electromagnetic coils 618b and 618e are represented by the letter "A", and the third pair of electromagnetic coils 618d and 618f are represented by the letter "C". The three junctions 648 in the three phase delta connection 646 are connected to both the power source 650 and a ground 652. A source switch 654 controls electrical current flow between the power source 650 and each junction 648, and a sink switch 656 controls the flow of electrical current between each junction 648 and the grounds, in a standard manner.

Figure 10:
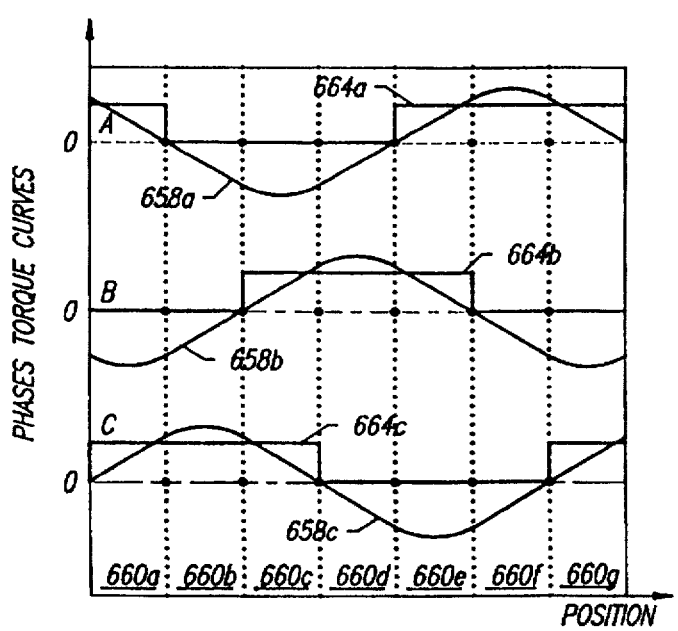
FIG. 10 is a current versus time chart, illustrating the relative polarity and phasing of electric current provided to the three primary electromagnetic coil pairs for generating a magnetic field wave which produces translatory motion of the armature relative to the stator.

FIG. 10 illustrates the phasing, polarity and intensity of the electrical current to the three primary coil pairs A, B and C and controlled by the three phase delta connection 646. This information is represented by the sinusoidal lines 658a–c as a function of time. It will be noted that all of the electromagnetic coils 618 are energized continuously with sinusoidally varying currents having changing phases and polarity, to generate magnetic flux within the stator 614 which interacts with the permanent magnetic flux in the armature 612 at the facing surfaces of the armature salient poles 622 and the stator salient poles 628, to maximize thrust of the armature relative to the stator in a desired direction.

The time line in FIG. 10 has been divided into 7 equal segments 660a–g, wherein the phasing, intensity and polarity of the current through the electromagnetic coils 618 is the same in segments 660a and 660g, showing the repeating nature of the current source to the coils. It takes three of the time segments 660 to move the armature 612 axially a distance equivalent to the spacing between tow adjacent armature salient poles 622. In this regard, FIG. 6 schematically illustrates both the electromagnetic coils 618 and the permanent magnets 616 during the second time segment 660b. Likewise, FIG. 7 illustrates the flux paths 662 of the magnetic flux generated by both the electromagnetic coils 618 and the permanent magnets 616 during the third time segment 660c. Moreover, FIG. 8 illustrated the flux paths 662 of the magnetic flux generated by both the electromagnetic coils 618 and the permanent magnets 616 during the fourth time segment 660d. Axial forces are generated on the armature 612 by the interactions of the permanent magnet field wave and electromagnet field wave. The axial force is produced by reluctance forces between the facing armature salient poles 622 and the stator salient poles 628.

With reference again to FIGS. 6–8 the coil connections and relative polarity of the connected electromagnetic pairs 618 are indicated by the letters A+, B+, B–, C+ and C–. All of the electromagnetic coils 618 are energized continuously with sinusoidally varying currents that are phased properly to increase flux in the facing salient poles 622 and 628 which are in position to generate maximum force in the desired direction. In FIGS. 6–8, the armature is being moved to the right, relative to the stator. Conversely, the electromagnetic coils 618 driving the stator salient poles 628 that would produce counterproductive forces are energized with reversed polarity that diminishes the permanent magnet flux, and thus maximizes the efficiency of the force production by having all coils operating simultaneously.

The electromagnetic coils 618 are at all times either adding flux to the stator salient poles 628 oriented in a position to develop forces relative to the flux generated by the permanent magnet rings 618 through the armature salient poles 622 in the desired direction, and diminishing force in the salient poles that would resist the desired output force. Stated somewhat differently, the electromagnetic coils 618 are arranged and connected within the stator 614 to generate additional magnetic flux having the same polarity as magnetic flux generated by the permanent magnet rings 616 between facing armature and stator salient poles 622 and 628 positioned to move the armature relative to the stator in a desired direction. Further, additional magnetic flux is provided by the electromagnetic coils 618 having an opposite polarity as the magnetic flux generated by the permanent magnet rings 616 between facing armature and stator salient poles 622 and 628 positioned to resist movement of the armature 612 relative to the stator 614 in the desired direction.

With reference one again to FIGS. 9 and 10, the switching function of the three phase delta connection 646 will now be described with reference to the three junctions 648. A first such junction 648a connects the "A" coils to the "B" coils, a second junction 648b connects the "B" coils to the "C" coils, and a third junction 648c connects the "C" coils to the "A" coils. During time segments 660a and g, the 656B sink and 654C source switches are opened, and both the 654A source and 656A sink switches are open. During time segment 660b, the 656A and 656B sink switches 656 are open and the 654C and 654B source switches are open. During time segment 660c the 656A and 656C sink switches are open and the 654B and 654C source switches are open. During time segment 660d the 656C and 656A sink switches are open and the 654B and 654A source switches are open. During time segment 660e, the 656C and 656B sink switches are open and the 654A and 654B source switches are open. Finally, during time segment 660f, the 656B and 656C sink switches are open and the 654A and 654C source switches are open.

In theory, the stator electromagnetic field can be caused to translate axially by (1) a sequential stepper control circuit that progressively energizes the coils 618 in the stator 614, (2) a contacting commutator or electrically conductive bars on the armature 612 that transmit information on armature position through sliding brush contact with electrically conductive brushes attached to the stator 614, or (3) use of non-contacting commutation means such as the multiplicity of Hall-effect sensors fixed relative to the stator 614 that are activated by the passage of the permanent magnet field of the armature 612 or by an axial position encoder either of the inductive, electrical contacting or optical type. Translating the stator magnetic field will produce forces on the armature 612 and continuous motion of the commutation signal is used to sequentially energize the coil sets in the manner above described to propel the armature 612 in the desired direction. The commutation and coil energizing function can be provided by servo control electronics that use the commutation signal in a closed loop feed-back type control.

The lines 664 in FIG. 10 illustrate the Hall-effect sensor signals generated during the various time segments 660a–g. The Hall-effect sensors 644 are used to determine when the torque curve 658 is positive for each of the phases. These sensors 644 provide digital signals that are 120 electrical degrees apart. The sensors 644 are sensitive to the direction of magnetic field originating from the permanent magnet rings 666 on the armature 612. The logical combination of these three signals define six repeating patterns representing precise locations of the armature 612 movement relative to the stator 614. In each of these locations a certain current circulation must be respected in order to achieve a consistent motor force in a given direction.

From the foregoing it is to be appreciated that the improved linear motor 610 is highly producible and inexpensive to manufacture from commercially available standard material forms rather than specialty parts which tend to be very expensive. The design of the linear motor 610 is spatially compact and electrically efficient producing a high force with relatively low moving mass of the armature parts. The armature 612 may be moved in either direction through the coaxial stator assembly 614 by simply reversing the current flow through the electromagnetic coils 618. A representation of current flow versus time in such a condition, moving the armature of FIGS. 6–8 to the left relative to the stator assembly 614, would be a mirror image of the graph of FIG. 7.

Although a particular embodiment of the invention has been described in detail for purposes of illustration, various modifications may be made without departing from the spirit and scope of the invention. Accordingly, the invention is not to limited, except as by the appended claims.

What is claimed is:

1. Apparatus for forming can body preforms into elongated can bodies comprising:
   a stationary support frame;
   a housing having can forming and ironing dies located therein mounted on said support frame;
   support means mounted on said support frame adjacent to said housing;
   a redraw assembly having a generally cylindrical passageway extending therethrough on said support frame for reciprocal movement relative thereto;
   reciprocating means for reciprocating said redraw assembly;
   said redraw assembly having a redraw sleeve having a generally cylindrical passageway extending therethrough;
   said redraw sleeve having opposite end portions and a central portion;
   one of said opposite end portions connected to said reciprocating means;
   the other of said opposite end portions having a can body preform having a closed bottom end and an integral, open ended cylindrical sidewall mounted thereon with said cylindrical sidewall surrounding said other of said opposite end portions;
   a reciprocable ram for movement through said redraw sleeve to contract a can body preform between said housing and said redraw sleeve to move said can body preform through said can forming and ironing dies; and
   a plurality of radially extending, circumferentially spaced apart air escape openings in said central portion of said redraw sleeve and spaced from said cylindrical sidewall to permit escape of air as said rams moves through said one of said opposite end portions and said central portion of said redraw sleeve toward said can body preform.

2. Apparatus as in claim 1 wherein:
   said reciprocating means comprise a linear motor having a fixed stator and a reciprocable armature having opposite end portions;
   said armature having an axial passageway extending therethrough for passage of said ram; and
   said redraw sleeve being mounted on one of said end portions.

3. Apparatus as in claim 2 and further comprising:
   computer control means for operating said linear motor.

4. Apparatus as in claim 3 wherein said linear motor comprises:
   a plurality of axially spaced apart salient poles on the armature;
   an axially polarized permanent magnet situated between each adjacent pair of armature salient poles;
   a plurality of axially spaced apart salient poles on the stator, wherein the axial spacing between adjacent stator salient poles is greater than the axial spacing between adjacent armature salient poles;
   an electromagnetic coil situated between each adjacent pair of stator salient poles;
   control means for sequentially energizing the electromagnetic coils to generate a translating magnetic field wave that interacts with the armature salient poles to produce translatory motion of the armature relative to the stator;
   said armature salient poles each form a ring surrounding a portion of the armature, and wherein each axially polarized permanent magnet forms a ring surrounding a adjacent portion of the armature; and
   said armature includes a non-magnetic sleeve underlying the armature salient pole rings and the permanent magnet rings.

5. Apparatus as in claim 3 wherein said linear motor comprises:
   a plurality of axially spaced apart salient poles on the armature, wherein each armature salient pole forms a ring surrounding an underlying portion of the armature;
   an axially polarized permanent magnet situated between each adjacent pair of armature salient poles, each permanent magnet forming a ring surrounding an adjacent underlying portion of the armature and being oppositely polarized with regard to each adjacent permanent magnet ring;
   a plurality of axially spaced apart salient poles on the stator, each forming a ring surrounding a portion of the armature, wherein the axial spacing between adjacent stator salient poles is greater than the axial spacing between adjacent armature salient poles;

an electromagnetic coil situated between each adjacent pair of stator salient poles, wherein each electromagnetic coil extends circumferentially around a portion of the armature between the adjacent pair of stator salient poles;

means for sequentially energizing the electromagnetic coils to generate a translating magnetic field wave to produce translatory motion of the armature relative to the stator, wherein the electromagnetic coils are all energized continuously with sinusoidally varying currents; and said electromagnetic coils generate magnetic flux having the same polarity as magnetic flux generated by the permanent magnets between facing armature and stator salient poles positioned to move the armature relative to the stator in a desired direction, and magnetic flux having an opposite polarity as magnetic flux generated by the permanent magnets between facing armature and stator salient poles positioned to resist movement of the armature relative to the stator in the desired direction.

6. A linear motor having an armature movable relative to a stator, comprising:

a plurality of axially spaced apart salient poles on the armature;

an axially polarized permanent magnet situated between each adjacent pair of armature salient poles;

a plurality of axially spaced apart salient poles on the stator, wherein the axial spacing between adjacent stator salient poles is greater than the axial spacing between adjacent armature salient poles;

an electromagnetic coil situated between each adjacent pair of stator salient poles;

control means for sequentially energizing the electromagnetic coils to generate a translating magnetic field wave that interacts with the armature salient poles to produce translatory motion of the armature relative to the stator;

said armature salient poles each form a ring surrounding a portion of the armature, and wherein each axially polarized permanent magnet forms a ring surrounding an adjacent portion of the armature; and said armature includes a non-magnetic sleeve underlying the armature salient pole rings and the permanent magnet rings.

7. A linear motor as set forth in claim 6, wherein the armature is generally cylindrical and the stator is coaxial with the armature.

8. A linear motor as set forth in claim 6, wherein each permanent magnet ring is oppositely polarized with regard to each adjacent permanent magnet ring.

9. A linear motor as set forth in claim 6, wherein the stator salient poles each form a ring surrounding a portion of the armature.

10. A linear motor as set forth in claim 6, wherein the axial spacing between the stator salient poles is one-third greater than the axial spacing between the armature salient poles.

11. A linear motor as set forth in claim 6, wherein each electromagnetic coil extends circumferentially around a portion of the armature, between the stator salient poles.

12. A linear motor as set forth in claim 6, including sleeve bearings for maintaining radial positioning of the stator relative to the armature, wherein the stator is fixed and the armature moves relative to the stator.

13. A linear motor as set forth in claim 6, including at least six electromagnetic coils, each being situated between a respective adjacent pair of stator salient poles, the electromagnetic coils being connected in three primary pairs, wherein each pair of electromagnetic coils has a 120 degree current phase difference with respect to the other two primary pairs of electromagnetic coils, when energized.

14. A linear motor as set forth in claim 13, wherein the at least six electromagnetic coils are all energized continuously with sinusoidally varying currents such that additional magnetic flux is provided having the same polarity as magnetic flux generated by the permanent magnets between facing armature and stator salient poles positioned to move the armature relative to the stator in a desired direction, and such that additional magnetic flux is provided having an opposite polarity as magnetic flux generated by the permanent magnets between facing armature and stator salient poles positioned to resist movement of the armature relative to the stator in the desired direction.

15. A linear motor as set forth in claim 13, wherein the means for sequentially energizing the electromagnetic coils includes a three-phase delta connection, and means for sensing the position of the armature relative to the stator.

16. A linear motor as set forth in claim 13, wherein the at least six electromagnetic coils are arranged such that a first coil is paired with a third coil and are connected so that the first coil has an opposite polarity compared with the third coil, a second coil is paired with a fifth coil and are connected so that the second coil and the fifth coil both have the same polarity, and a fourth coil is paired with a sixth coil and are connected so that the fourth coil has an opposite polarity compared with the sixth coil, when energized.

17. A linear motor as set forth in claim 16, wherein all of the at least six electromagnetic coils are continuously energized with the phasing and polarity of the current through the at least six electromagnetic coils changing to maximize thrust of the armature relative to the stator.

18. Apparatus as in claim 6 wherein:

said control means comprise a computer system.

19. An electromagnetic linear motor having an armature movable relative to a coaxial stator, the linear motor comprising:

a plurality of axially spaced apart salient poles on the armature, wherein each armature salient pole forms a ring surrounding an underlying portion of the armature;

an axially polarized permanent magnet situated between each adjacent pair of armature salient poles, each permanent magnet forming a ring surrounding an adjacent underlying portion of the armature and being oppositely polarized with regard to each adjacent permanent magnet ring;

a plurality of axially spaced apart salient poles on the stator, each forming a ring surrounding a portion of the armature, wherein the axial spacing between adjacent stator salient poles is greater than the axial spacing between adjacent armature salient poles;

an electromagnetic coil situated between each adjacent pair of stator salient poles, wherein each electromagnetic coil extends circumferentially around a portion of the armature between the adjacent pair of stator salient poles;

means for sequentially energizing the electromagnetic coils to generate a translating magnetic field wave to produce translatory motion of the armature relative to the stator, wherein the electromagnetic coils are all energized continuously with sinusoidally varying currents; and said electromagnetic coils generate magnetic flux having the same polarity as magnetic flux generated by the permanent magnets between facing armature and stator salient poles positioned to move the armature relative to the stator in a desired direction, and magnetic flux having an opposite polarity as magnetic flux generated by the permanent magnets between facing armature and stator salient poles positioned to resist movement of the armature relative to the stator in the desired direction.

20. A linear motor as set forth in claim 19, wherein the armature is generally cylindrical, the stator is fixed, and the armature moves relative to the stator, and including sleeve bearings fixed to the stator for maintaining radial positioning of the stator relative to the armature.

21. A linear motor as set forth in claim 19, wherein the armature includes a non-magnetic sleeve underlying the armature salient pole rings and the permanent magnet rings.

22. A linear motor as set forth in claim 19, wherein the axial spacing between the stator salient poles is one-third greater than the axially spacing between the armature salient poles.

23. A linear motor as set forth in claim 22, including at least six electromagnetic coils, each being situated between a respective adjacent pair of stator salient poles, the electromagnetic coils being connected in three primary pairs, wherein each pair of electromagnetic coils has a 120 degree current phase difference with respect to the other two primary pairs of electromagnetic coils, when energized.

24. A linear motor as set forth in claim 23, wherein the means for sequentially energizing the electromagnetic coils includes a three-phase delta connection, and means for sensing the position of the armature relative to the stator.

25. A linear motor as set forth in claim 23, wherein the at least six electromagnetic coils are arranged such that a first coil is paired with a third coil and are connected so that the first coil has an opposite polarity compared with the third coil, a second coil is paired with a fifth coil and are connected so that the second coil and the fifth coil both have the same polarity, and a fourth coil is paired with a sixth coil and are connected so that the fourth coil has an opposite polarity compared with the sixth coil, when energized.

26. An electromagnetic linear motor having a generally cylindrical armature movable relative to a stator, the linear motor comprising:

a plurality of axially spaced apart salient poles on the armature, wherein each armature salient pole forms a ring surrounding an underlying portion of the armature;

an axially polarized permanent magnet situated between each adjacent pair of armature salient poles, each permanent magnet forming a ring surrounding an adjacent underlying portion of the armature and being oppositely polarized with regard to each adjacent permanent magnet ring;

a non-magnetic sleeve underlying the armature salient pole rings and the permanent magnet rings;

a plurality of axially spaced apart salient poles on the stator, each forming a ring surrounding a portion of the armature, wherein the axial spacing between adjacent stator salient poles is one-third greater than the axial spacing between adjacent armature salient poles;

at least six electromagnetic coils each being situated between a respective adjacent pair of stator salient poles and extending circumferentially around a portion of the armature, the electromagnetic coils being connected in three primary pairs, wherein each pair of electromagnetic coils has a 120 degree current phase difference with respect to the other two primary pairs of electromagnetic coils, when energized; and means for continuously energizing the electromagnetic coils and varying the phasing and polarity of the current through the electromagnetic coils to generate a translating magnetic field wave to produce translatory motion of the armature relative to the stator.

27. A linear motor as set forth in claim 26, wherein the at least six electromagnetic coils are all energized with sinusoidally varying currents such that additional magnetic flux is provided having the same polarity as magnetic flux generated by the permanent magnets between facing armature and stator salient poles positioned to move the armature relative to the stator in a desired direction, and such that additional magnetic flux is provided having an opposite polarity as magnetic flux generated by the permanent magnets between facing armature and stator salient poles positioned to resist movement of the armature relative to the stator in the desired direction.

28. A linear motor as set forth in claim 26, wherein the at least six electromagnetic coils are arranged such that a first coil is paired with a third coil and are connected so that the first coil has an opposite polarity compared with the third coil, a second coil is paired with a fifth coil and are connected so that the second coil and the fifth coil both have the same polarity, and a fourth coil is paired with a sixth coil and are connected so that the fourth coil has an opposite polarity compared with the sixth coil, when energized.

29. A linear motor as set forth in claim 26, wherein the means for sequentially energizing the electromagnetic coils includes a three-phase delta connection, and means for sensing the position of the armature relative to the stator.

30. A linear motor as set forth in claim 26, including sleeve bearings for maintaining radial positioning of the stator relative to the armature, wherein the stator is fixed and the armature moves relative to the stator.

* * * * *